Dec. 17, 1929.   E. S. M. LOVELACE   1,740,255
TOPOGRAPHY LEVEL AND TRANSIT
Filed March 12, 1927
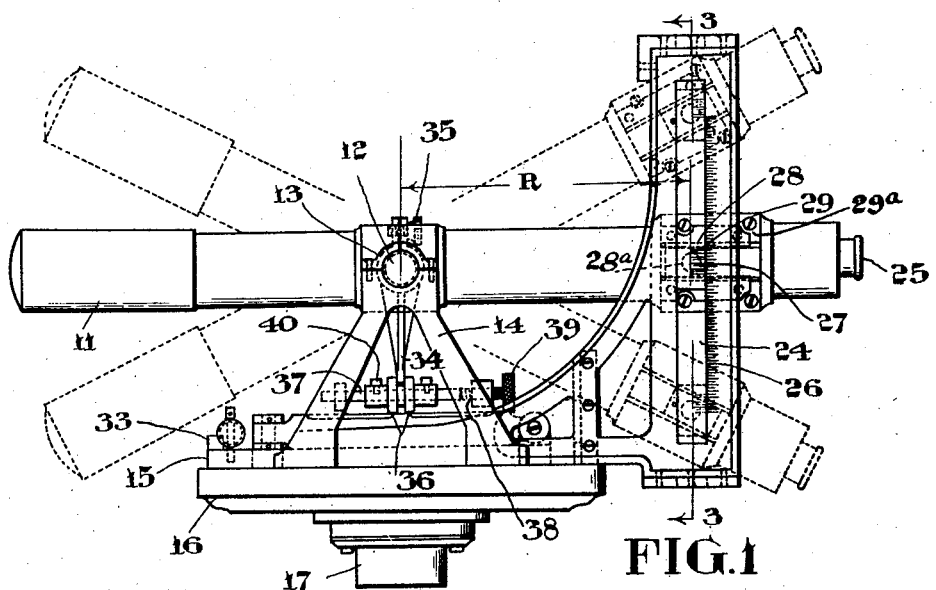
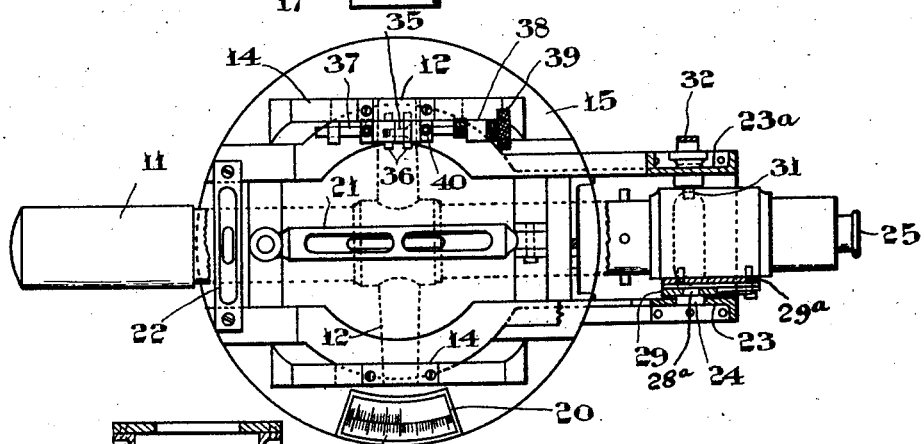
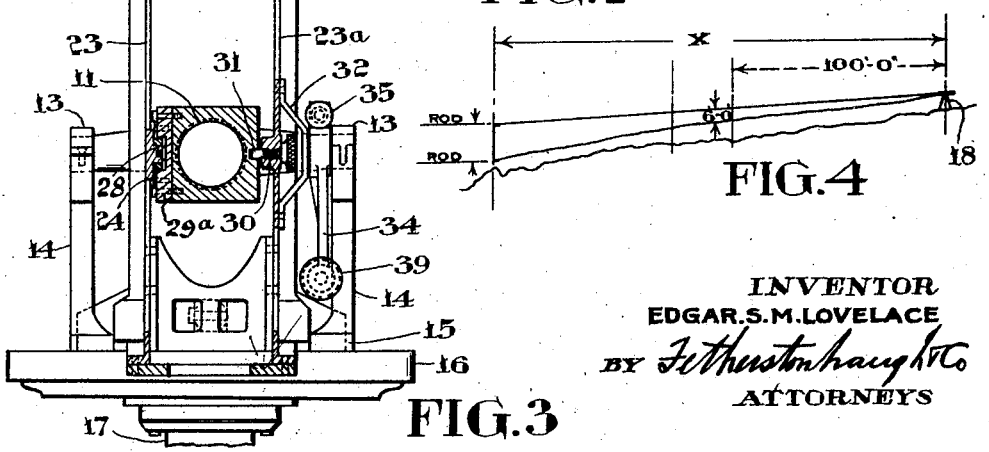
INVENTOR
EDGAR.S.M.LOVELACE
BY Fetherstonhaugh & Co
ATTORNEYS Patented Dec. 17, 1929

1,740,255

UNITED STATES PATENT OFFICE

EDGAR S. M. LOVELACE, OF WESTMOUNT, QUEBEC, CANADA

TOPOGRAPHY LEVEL AND TRANSIT

Application filed March 12, 1927. Serial No. 174,853.

This invention relates to new and useful improvements in surveying instruments, and particularly to instruments used for taking topographical surveys, and the object of the invention is to provide an instrument which will allow extensive topographical survey to be made with the minimum amount of labour and the minimum amount of error.

Another object is to provide a compact robust instrument which will be easily controlled and adjusted.

According to my invention a telescope such as is used in the ordinary engineer's dumpy level, is mounted transit fashion on short standards, so that within certain limits the telescope may be elevated or depressed. Slidably mounted on guides, in proximity to the eye-piece of the level, is a carriage and rotably secured to the carriage is a vernier which slides in the vertical direction between guides, one of which is provided with a scale. The graduations on this scale are such that they indicate percentage grades to fascilitate calculations for obtaining distances and elevations. The short standards are mounted on a base plate which is provided with a spirit level to facilitate the setting up of the instrument. Means are also provided for adjusting the angle of the telescope to a very fine degree. The telescope is so mounted that it can be rotated on the base.

In the drawings which illustrate my invention;—

Figure 1 is a side elevation of my improved topographical instrument.

Figure 2 is a plan view of the instrument with parts broken away to show the construction of the base of the level.

Figure 3 is a sectional end elevation of the instrument taken on the line 3—3 Figure 1.

Figure 4 is a diagrammatic illustration of the instrument in use and the manner of operating same.

Referring more particularly to the drawings, 11 designates a telescope which may be of practically the same constructions at telescopes used in ordinary engineers' levels, and the like. Extending outwardly from the sides of the telescope, near the centre thereof, are the trunnions 12, which are rotatably mounted in bearings 13 formed in short standards 14, extending upwardly on each side of the telescope from a base 15, which is rotatably mounted on a sub-base 16 having a downwardly projecting bearing 17 which fits into the top plate of the usual transit supporting legs 18, shown diagrammatically in Figure 4. The sub-base is provided with a scale 19 indicating degrees of angular measurement, and the base may be provided with a slot 20 to facilitate the reading of the angles. A vernier scale may be formed in the edge of the slot to allow accurate horizontal angular readings to be taken. Mounted in the centre of the base and at the front of the same, are the bubble or spirit levels 21 and 22, which facilitate the setting up of the instrument should its level alter during the operation of same. Extending outwardly from the base and rigidly secured thereto, by any suitable means, are the vertical guides 23 and 23$^a$, the guide 23 being provided with a slot 24. The guides are positioned one on each side of the telescope in proximity to the eye-piece 25. One edge of the slot 24 is provided with a scale 26. The graduations on this vertically disposed scale are marked to indicate percentage grades, a marking which greatly facilitates the calculations necessary for a topographical survey, namely distances and elevations. As an example of the manner of marking, the distance R equals the distance between the centre of the slot and the centre of the trunnions, which we will assume as 5″, then the main graduations on the vertical scale will be equal to R divided by one hundred $$\left(\frac{R}{100}\right) \text{ or } \frac{5}{100},$$

which equals one twentieth of an inch. These graduations may be sub-divided as desired. The distance between each of the main graduation indicates a rise or fall of 1.0% grade, and by using a vernier scale, readings of 0.05% may be readily obtained. The vernier scale 27 is shown marked on the slide 28, which contacts with the sides of the slot 24 and may be moved in the vertical direction. The slide is pivotally secured to a carriage 29 slidably mounted in guides carried by a plate 29$^a$ secured to or formed integral with the sides of the telescope. The pivotal connection between slide 28 and carriage 29 consists of a stud 28ᵃ carried by the slide and rotatably mounted in a suitable opening formed in the carriage. Passing through a hole in the guide 23ᵃ, is the screw 30, the point of which is adapted to enter a hole 31 formed in the side of the telescope and to hold same in the horizontal plane or parallel with the base plate, when the device is being used as an ordinary level. A suitable guard 32 may be fitted over the screw 30. Suitable counterbalancing weights (not shown) may be placed at the point 33 of the base to counterbalance the extra weight due to the mounting of the guide. The telescope may be manipulated by moving the arm 34, which is clamped to one of the trunnions by means of the clamp and screw 35. The free end of the arm fits between a pair of collars 36 mounted on a screwed spindle 37, supported in threaded bearings 38 secured to the base. The screwed spindle is provided with a knurled head 39 to facilitate the operation of the screw. The collars are secured to the screwed spindle by means of the studs 40.

In operation the device is operated as follows, and shown diagrammatically in Figure 4. Based on the principle of similar triangles and referring to the diagram, it will be seen that the horizontal distance X is equal to the difference between the rod readings taken, multiplied by one hundred and divided by the difference between the corresponding grades. For example, with the vernier set at the grade reading of 120 and the reading on the rod as .84 (entered in the level book as $$\frac{.84}{120.00}$$

and that with the vernier set at 114, the corresponding rod reading is 13.44, then the difference between the rod readings is 12.60 and the difference between the grade readings is 6. Therefore, the distance $$X = \frac{12.60 \times 100}{6} = 210 \text{ units,}$$

which simple calculation may be made mentally. To get the elevation, the distance being given as 210 and the depression as 20 feet for every hundred feet, then $2.10 \times 20 = 42$ feet plus the rod reading of .84 = 42.84 ft. to be deducted from the height of the instrument.

It will be seen that in operation, results are quickly and readily obtained. It will be noticed that the large level is fastened to the base, replacing the magnetic compass usually furnished with an ordinary transit. This arrangement furnishes a plane of reference which allows the instrument to be maintained in a truly horizontal position, irrespective of the position of the telescope. It will be readily seen by those familiar with this art, that with the use of the instrument herein described, tangents can be located, courses run, angles measured, in fact, practically all the work usually done with an ordinary transit and distances and elevations of points may be obtained by the one instrument functioning both as a level and a transit. When used as a level, the telescope is held in the horizontal position by a screw. To secure fine adjustments, the level is set in the approximate position and by clamping the arm to the trunnions and moving the operating screw for the arm, very fine settings may be obtained. Horizontal angular measurements are obtained at the base of the instrument.

Having thus described my invention, what I claim is:—

1. An instrument of the character described comprising a base having upwardly extending supporting arms, a telescope provided with trunnions rotatably mounted in bearings carried by said arms, a depending arm having its upper end fixed to one of the trunnions of the telescope, a spindle supported in bearings carried by the base and having threaded engagement with one of said bearings whereby said spindle is adapted to travel longitudinally when rotated in said bearings, means carried by the spindle and engaging the lower end of said arm to cause swinging movement of the arm and telescope in response to traveling movement of the spindle, an upright guide carried by the base and disposed adjacent one end of the telescope, said guide being formed with a vertically extending slot and provided with percentage grade markings along one side of said slot, a plate slidably secured to the telescope so as to be capable of traveling movement longitudinally of the telescope, a second plate directly pivoted to the first mentioned plate and having its top portion disposed in said slot for rectilinear sliding movement therein, said second plate having a vernier scale marked thereon to cooperate with the percentage grade markings at one side of the slot.

2. An instrument of the character described comprising a base, a telescope pivotally mounted on the base for swinging movement in a vertical direction, a pair of upright guides carried by the base and disposed adjacent one end of the telescope and at opposite sides thereof, one of said guides being provided with a vertically extending slot and with percentage grade markings along one side of said slot, a plate carrying a vernier scale arranged in said slot to travel vertically therein, means slidably and pivotally connecting said plate to the telescope and a screw threaded through the remaining guide and adapted at times to enter a recess formed in the telescope directly opposite said plate so as to secure the telescope in a horizontal position.

In witness whereof, I have hereunto set my hand.

EDGAR S. M. LOVELACE.